United States Patent
Parthasarathy et al.

(10) Patent No.: US 7,600,096 B2
(45) Date of Patent: Oct. 6, 2009

(54) COPROCESSOR EXTENSION ARCHITECTURE BUILT USING A NOVEL SPLIT-INSTRUCTION TRANSACTION MODEL

(75) Inventors: Sivagnanam Parthasarathy, San Diego, CA (US); Alexander Driker, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 1416 days.

(21) Appl. No.: 10/299,120

(22) Filed: Nov. 19, 2002

(65) Prior Publication Data

US 2004/0098563 A1   May 20, 2004

(51) Int. Cl.
    *G06F 15/80* (2006.01)
(52) U.S. Cl. ...................................... 712/34
(58) Field of Classification Search .............. 712/34
    See application file for complete search history.

(56) References Cited

U.S. PATENT DOCUMENTS

| | | | | |
|---|---|---|---|---|
| 5,638,525 A | * | 6/1997 | Hammond et al. | 712/209 |
| 5,790,824 A | * | 8/1998 | Asghar et al. | 712/209 |
| 5,812,854 A | | 9/1998 | Steinmetz et al. | 395/709 |
| 5,819,097 A | | 10/1998 | Brooks et al. | 395/705 |
| 5,881,290 A | | 3/1999 | Ansari et al. | 395/705 |
| 6,006,322 A | | 12/1999 | Muramatsu | 712/200 |
| 6,044,453 A | | 3/2000 | Paver | 712/201 |
| 6,182,279 B1 | | 1/2001 | Buxton | 717/3 |
| 6,282,633 B1 | | 8/2001 | Killian et al. | 712/208 |
| 6,286,134 B1 | | 9/2001 | Click, Jr. et al. | 717/5 |
| 6,308,255 B1 | * | 10/2001 | Gorishek et al. | 712/209 |
| 6,480,952 B2 | * | 11/2002 | Gorishek et al. | 712/227 |

OTHER PUBLICATIONS

Sima, Fountain and Kacsuk.Advanced Computer Architectures. Addison-Wesley, 1998. Pages ***.*
Kime and Mano. Logic and Computer Design Fundamentals. Prentice Hall, 2000. Pages.*
Hennessy and Patterson. Computer Organization and Design. Morgan Kaufmann Publishers, Inc. 1998. Pages.*
The American Heritage College Dictionary, 4$^{th}$ Ed., Houghton Mifflin Company, pp. 295 and 975.*

* cited by examiner

*Primary Examiner*—Aimee J Li
(74) *Attorney, Agent, or Firm*—Lisa K. Jorgenson; William A. Munck (57) ABSTRACT

A processor architecture supports an electrical interface for coupling the processor core to one or more coprocessor extension units executing computational instructions, with a split-instruction transaction employed to provide operands and instructions to an extension unit and retrieve results from the extension unit. The generic instructions for sending an operation and data to the extension unit and/or retrieving data from the extension unit allow new computational instructions to be introduced without regeneration of the processor architecture. Support for multiple extension units and/or multiple execution pipes within each extension unit, multi-cycle execution latencies and different execution latencies between or within extension units, extension unit instruction predicates, and for handling processor core stalls and result save/restore on interrupt is included.

26 Claims, 6 Drawing Sheets

COPROCESSOR EXTENSION ARCHITECTURE BUILT USING A NOVEL SPLIT-INSTRUCTION TRANSACTION MODEL

TECHNICAL FIELD OF THE INVENTION

The present invention is directed, in general, to processor instruction set architectures (ISAs) and, more specifically, to extending or altering processor instruction set architectures.

BACKGROUND OF THE INVENTION

Processor instruction set requirements generally evolve with changing application domains. In particular, digital signal processing applications can be made to perform better with special instructions. However, the particular instructions needed to achieve such performance improvement typically change over time.

Current methods for accommodating the instruction set requirements of new application domains include either extending the instruction set, which leads to instruction set bloating and increasingly complex processor designs, or regeneration of a tailored processor from a processor core with sub-optimal (slow core) baseline performance. Current approaches to quick regeneration require the new instruction (s) to be simple enough to fit within the existing execution pipeline, and thereby limits the complexity of new instructions in terms of latency and resource usage. Accordingly, the current methods cannot accommodate the needs of new instructions that require a complex data path (more pipeline stages), an additional internal state (e.g., a private register file) or many-cycle execution latency with optionally pipelined operation.

There is, therefore, a need in the art for an architecture providing good performance for native instructions while supporting new single or multi-cycle instructions which may include complex data paths, an additional internal state, and optionally pipelined operation, with latencies known to the compiler and used for instruction scheduling.

SUMMARY OF THE INVENTION

To address the above-discussed deficiencies of the prior art, it is a primary object of the present invention to provide, for use in a processor architecture, an electrical interface for coupling the processor core to one or more coprocessor (core extension) units executing computational (user-defined) instructions, with a split-instruction transaction model employed to provide an instruction and the instruction's operands to the extension unit and to retrieve results from the extension unit. The generic core-extension instructions allow for new computational instructions to be introduced, together with the capability to send data to an extension unit and/or retrieve a result from the extension unit, without regeneration of the processor architecture. Support is included for multiple extension units and/or multiple execution pipelines within each extension unit, multi-cycle execution latencies and different execution latencies between or within extension units, extension unit instruction predicates, processor core stalls and result save/restore on interrupt.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the detailed description of the invention below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
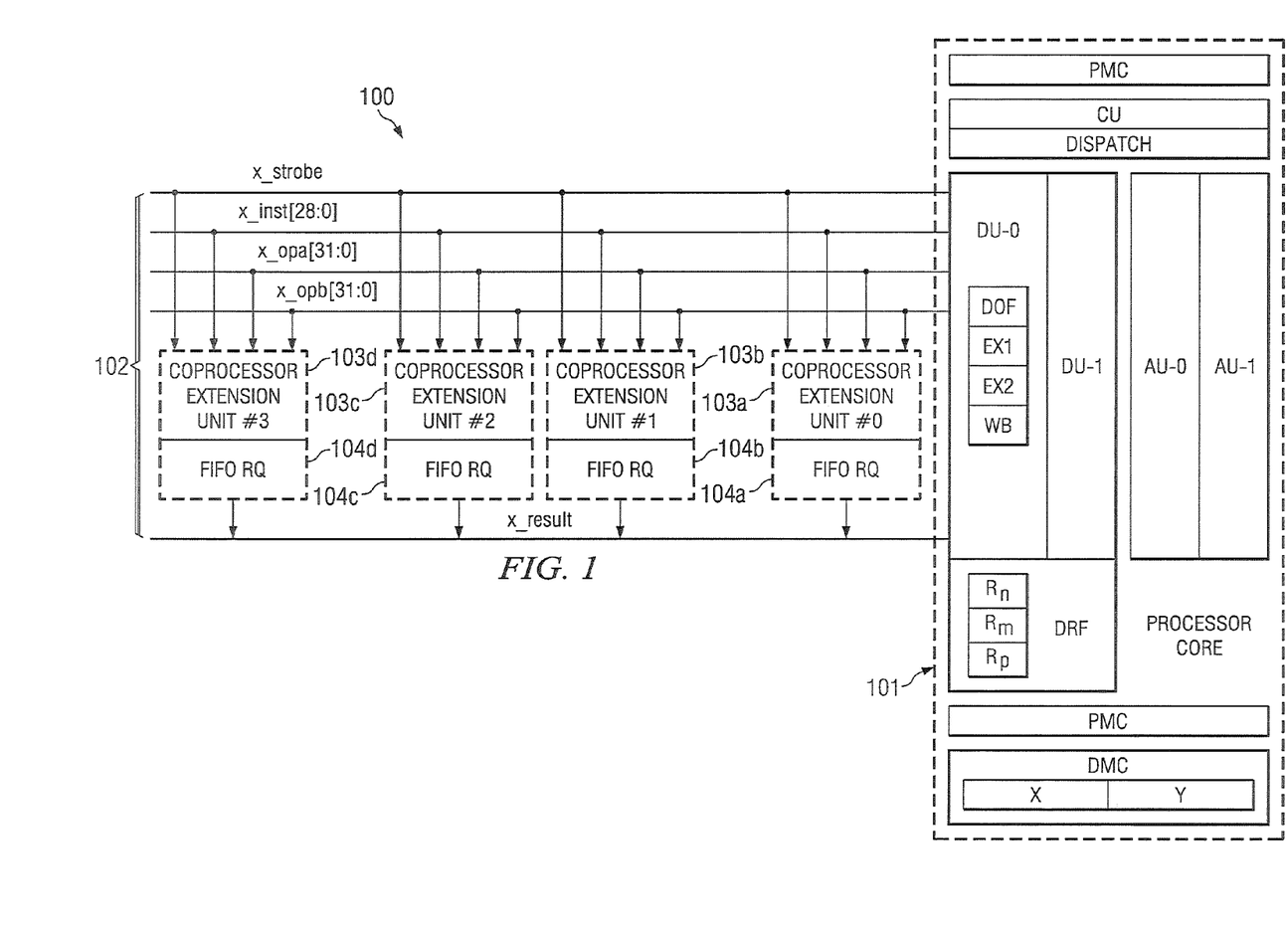
FIG. 1 depicts a processor architecture including a split transaction model coprocessor extension interface according to one embodiment of the present invention.

FIG. 1 depicts a processor architecture including a split transaction model coprocessor extension interface according to one embodiment of the present invention. As an alternative to extending instruction sets for changing application domains through regeneration, the present invention defines a flexible alternative for a high-performance digital signal processor that includes a customizable coprocessor extension architecture with a well-defined coprocessor interface supporting multiple coprocessors. This architecture allows for easy integration of the coprocessor with a core hard macro for SOC (System On Chip) designs.

Processor architecture 100 comprises a core 101 including a program memory controller PMC with program memory (not explicitly shown), a control unit CU, two data unit pipelines DU-0 and DU-1 working with a data register file DRF, a data memory banks X and Y. Each data unit includes a data operand fetch pipeline stage (DOF) where source operands Rn, Rp are retrieved (fetched) from the DRF; two execute pipeline stages EX1 and EX2 where standard core instructions execute; and a write-back (WB) stage where instruction result Rm is written into the DRF. Coupled to one data unit pipeline DU-0 is a coprocessor extension electrical interface 102 comprising a five bit extension strobe bus x_strobe, a twenty-nine bit extension instruction bus x_inst, a thirty-two bit coprocessor extension first operand bus x_opa, a thirty-two bit coprocessor extension second operand bus x_opb, and a forty bit coprocessor extension result bus x_result.

The extension interface 102 couples the core 101 to one or more coprocessor extension units 103a-103d, each optionally including a first-in, first-out (FIFO) output buffer 104a-104d. In the exemplary embodiment, the coprocessor extension units 103a-103d are addressed utilizing a two bit identifier, which implies support for up-to four coprocessor extension units. However, the present invention may be readily limited or extended to fewer or more coprocessor extension units.

The x_strobe signals comprise information from different pipeline stages of the core 101, including a one bit coprocessor extension instruction valid x_valid signal, a one bit signal x_schedule indicating that the valid coprocessor extension instruction is scheduled and is in the execute stage 1 (EX1) pipe-stage, a two bit coprocessor extension instruction predicate value signal x_guard, and a one bit write back signal x_wb indicating that the coprocessor extension instruction is expected to produce a result.

TABLE I below summarizes the signals within the coprocessor extension interface 102, where "type" refers to whether the signal is an input or output for the processor core:

TABLE I

| Signal Name | Width | Type | Pipe Stage | Description |
| --- | --- | --- | --- | --- |
| x_valid | 1 | Output | DOF | Coprocessor instruction is valid |
| x_inst | 28:0 | Output | DOF | Coprocessor extension instruction [31:7|3:0] |
| x_schedule | 1 | Output | EX1 | Coprocessor instruction that was valid in cycle DOF has entered DU Pipe EX1 stage |
| x_opa | 31:0 | Output | EX1 | First coprocessor operand |
| x_opb | 31:0 | Output | EX1 | Second coprocessor operand |
| x_wb | 1 | Output | EX1 | Coprocessor instruction with XLD component is in EX1 stage |
| x_except | 1 | Input | EX1 | Exception status driven by coprocessor |
| x_guard | 2 | Output | EX2 | Predicate Gx, (Gx__16) state |
| x_result | 39:0 | Input | EX2 | Coprocessor result bus |

After issuing a coprocessor instruction in the data operand fetch stage, the processor core 101 may potentially stall, in which case the x_schedule signal would be inactive in the following cycle. Therefore, until x_schedule becomes active, the coprocessor extension should continue to decode the x_inst issued in the prior cycle.

Figure 2A:
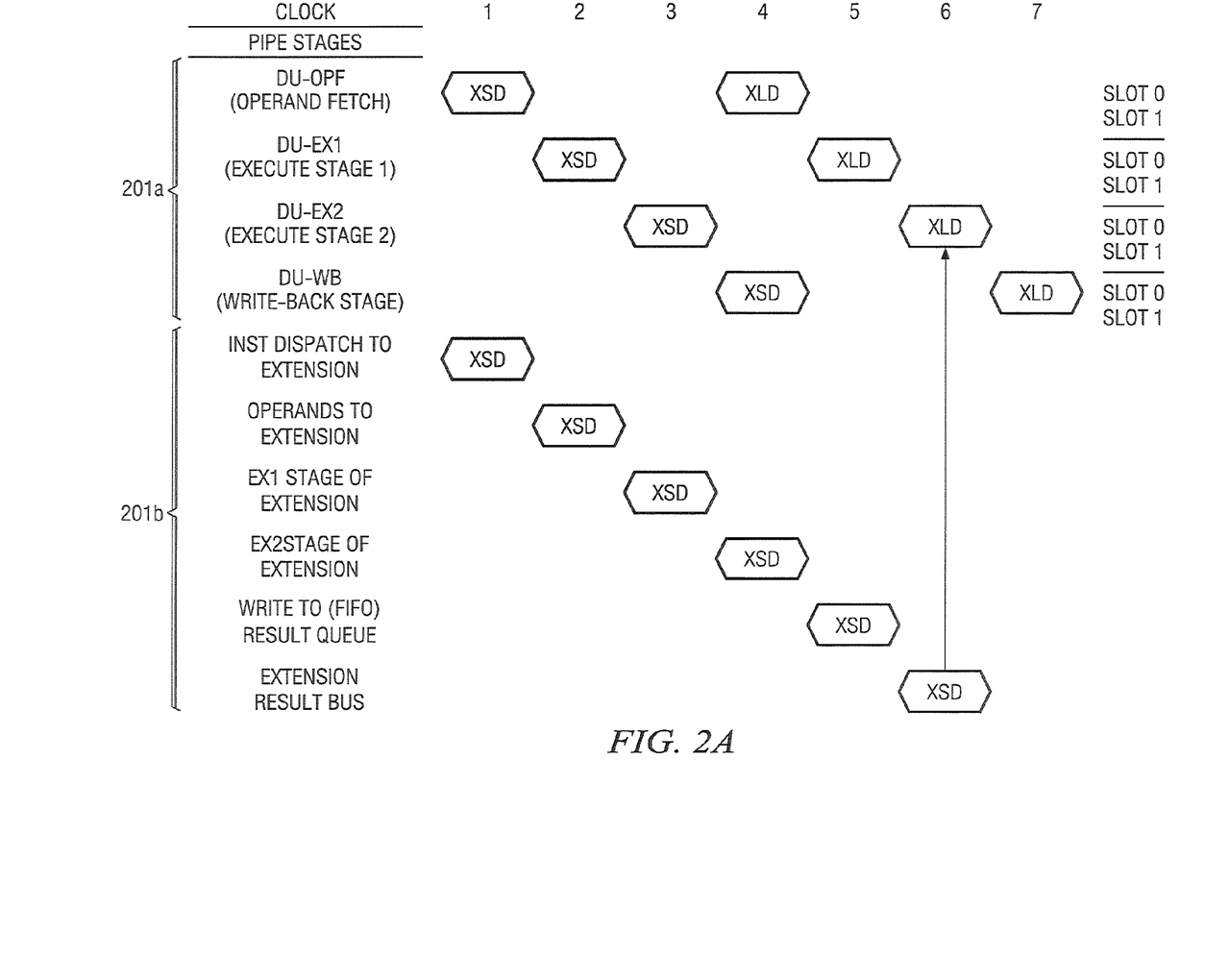
FIGS. 2A-2C are timing diagrams illustrating the operation of split transaction execution with pipelined and non-pipelined operation and with and without a result queue for split transaction coprocessor extensions according to various embodiments of the present invention.
Figure 2B:
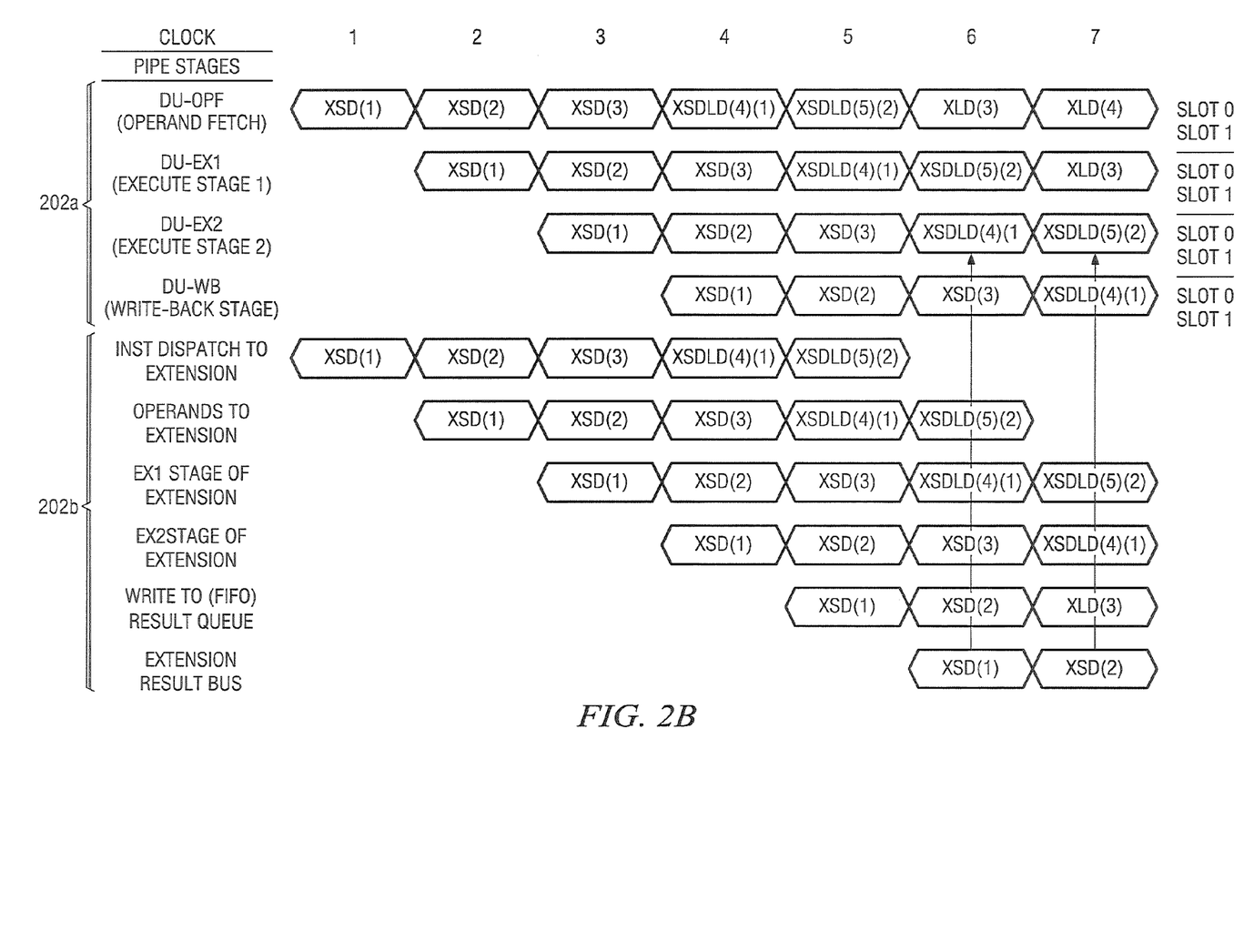
Figure 2C:
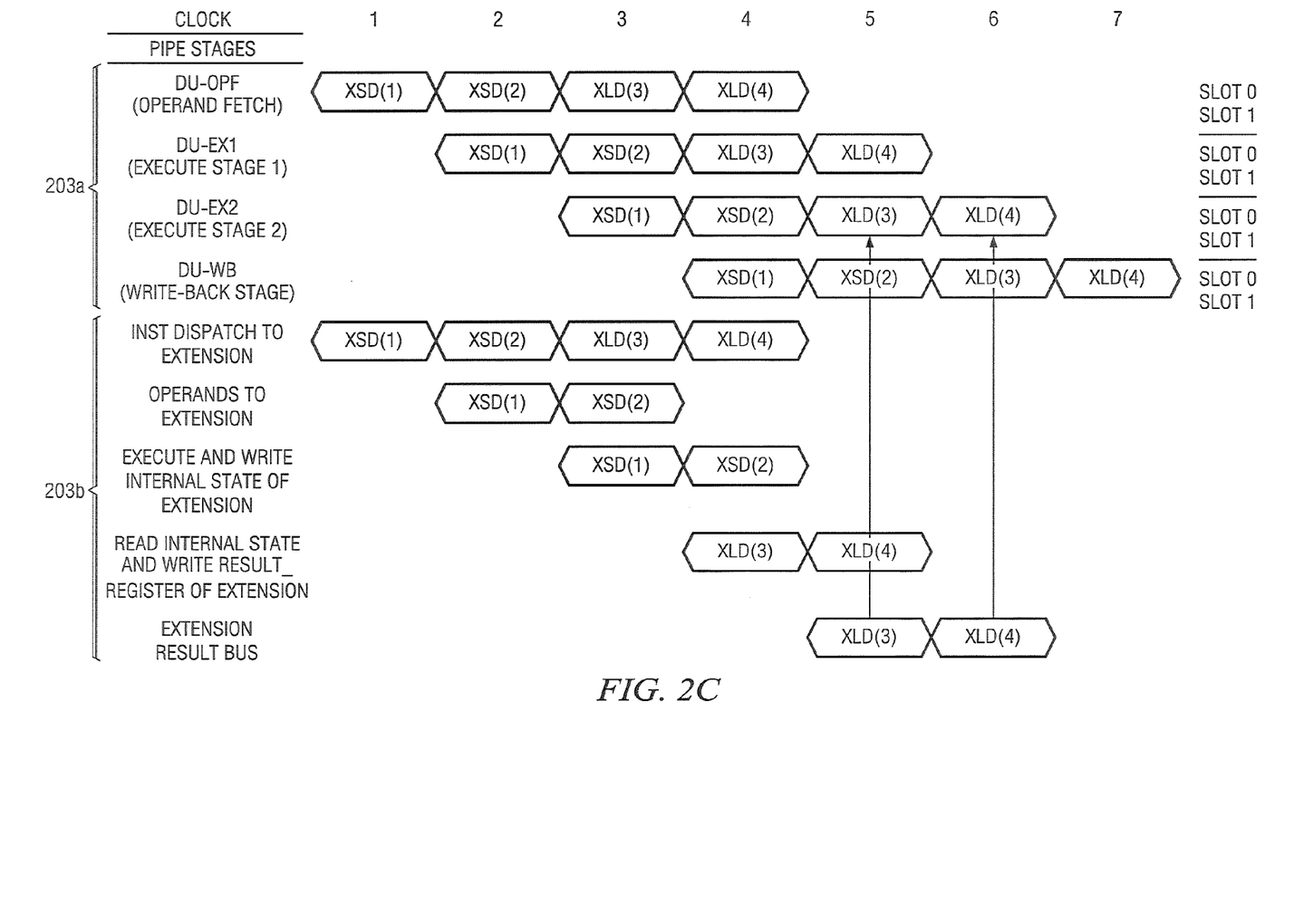

FIGS. 2A through 2C are timing diagrams illustrating the operation of split transaction execution with pipelined and non-pipelined operation and with and without a result queue for split transaction coprocessor extensions according to various embodiments of the present invention. In the simplest form, the coprocessor extension includes an application specific function having a latency of L cycles and a throughput of T cycles used in pipelined fashion. The coprocessor extension instructions follow a split-transaction model where a minimum of two coprocessor extension instructions are required to execute an operation in the coprocessor and retrieve the operation result from the coprocessor. By contrast, a single transaction model needs only a single coprocessor instruction to initiate the operation and provide an internal core destination. This model may also be employed in the present invention in the case where the operation result is stored inside the coprocessor, either as an internal state or in a coprocessor register file.

In the case of the split-transaction model, the first core-extension instruction provides the operands and operation to the coprocessor and the second core-extension instruction retrieves the result generated by the previous instruction (and optionally also sends another operation with associated operands, to be explained later). This split-transaction model allows user-defined latencies of coprocessor extension functions, and takes a minimum of L cycles.

The first core-extension instruction that sends a user-defined operation and operand(s) to a coprocessor extension unit 103a-103d is represented in the instruction set architecture (ISA) for the processor core 101 as:

```
XSD    Rn, Rp, #xspc11    // XSD (Store Data to eXtension)
                          // Data to store: registers Rn, Rp of DRF
                          // #xspc11 specifies 11 user-defined bits
``` where xspc is an extension specific instruction field that specifies the (user-defined) coprocessor operation. The second core-extension instruction that sends an operation and retrieves a result is represented in the core ISA as:

```
XLD    Rm, #xspc15    // XLD (Load Data from eXtension)
                      // Retrieved data is written to register Rm of DRF
                      // #xspc15 specifies 15 user-defined bits
```

The pipeline diagram of FIG. 2A illustrates the split-transaction for a latency L=3 for non-pipelined operation, with optimal scheduling of the load data instruction XLD three cycles behind the XSD instruction. The upper portion 201a of FIG. 2A illustrates the operations within the processor core 101, while the lower (italicized) portion 201b illustrates the corresponding operations within the coprocessor extension interface 102. The corresponding assembly code for the instruction sequence illustrated in FIG. 2A is shown below in TABLE II:

TABLE II

| PC [31:0] | DU Instruction | |
|---|---|---|
| (GP32 Mode) | Slot 1 | Slot 0 |
| 0x100 | DU-OP | Gx? XSD Rn, Rp, #xspc11 |
| 0x108 | DU-OP | DU-OP |
| 0x110 | DU-OP | DU-OP |
| 0x118 | DU-OP | Gx? XLD Rm, #xspc15 |
| 0x120 | DU-OP | Gy? XSD Rn, Rp, #xspc11 |
| 0x128 | DU-OP | DU-OP |
| 0x130 | DU-OP | DU-OP |
| 0x138 | DU-OP | Gy? XLD Rm, #xspc15 | where the program counter (PC) value presumes that the processor core 101 is executing in a mode utilizing a comprehensive 32-bit general purpose instruction set (GP32). The line diagram of FIG. 2A illustrates that with optimal scheduling, the load data instruction XLD is three cycles behind the store data instruction XSD, equal to the latency of the coprocessor extension unit.

Obviously, if the coprocessor extension is operated in a pipelined manner, one result may be produced from the coprocessor extension unit every cycle. However, the definition of the coprocessor extension architecture is limited in this embodiment to issuing only one coprocessor instruction per cycle. Given that constraint, the coprocessor extension cannot be operated in a pipelined manner for code sequences including an XSD followed by an XLD. Therefore, an instruction of the form send data and load data XSDLD is needed that implies sending the operation and operand(s) to the extension and concurrently loading a result from the extension. The pipeline diagram of FIG. 2B illustrates the split-transaction for latency L=3 operated in a pipelined manner, with the corresponding assembly code shown below in TABLE III:

TABLE III

| PC [31:0] | DU Instruction | |
|---|---|---|
| (GP32 Mode) | Slot 1 | Slot 0 |
| 0x100 | DU-OP | XSD Rn, Rp, #xspc11 (1) |
| 0x108 | DU-OP | XSD Rn, Rp, #xspc11 (2) |
| 0x110 | DU-OP | XSD Rn, Rp, #xspc11 (3) |
| 0x118 | DU-OP | XSDLD Rm, Rn, Rp #xspc7 (4) (1) |
| 0x120 | DU-OP | XSDLD Rm, Rn, Rp #xspc7 (5) (2) |
| 0x128 | DU-OP | XLD Rm, #xspc15 (3) |
| 0x130 | DU-OP | XLD Rm, #xspc15 (4) |
| 0x138 | DU-OP | XLD Rm, #xspc15 (5) |

The coprocessor extension instructions are tagged with an identifier in parentheses indicating the load data instruction XLD that matches with each send data instruction XSD. In the case of the send data and load data instruction XSDLD, a pair of identifiers in parentheses is used with the first corresponding to the send data part and the second corresponding to the instruction whose result the load data part retrieves (Rm: destination operand register; Rn, Rp: source operand registers).

FIG. 2B illustrates pipelining of coprocessor extension operations assuming that the result is retrieved using either the load data instruction XLD or the load data component of the combined instruction XSDLD, if performed optimally. However, if the processor core 101 either stalls (the coprocessor is not aware of core stalls) or switches threads due to an interrupt, and is therefore unable to pick up the result in an optimal manner, a clear possibility exists of losing the coprocessor result in the absence of temporary storage for that result.

To solve this problem, a FIFO result queue (RQ) structure 104a-104d is needed for each coprocessor extension unit 103a-103d to hold the spill over, enabling the coprocessor extension pipeline to run independently of the processor core 101 without being influenced by core stall conditions (since the coprocessor extension unit 103a-103d does not stall when the processor core 101 stalls). The presence of a result queue implies that the load data instruction (or the load data component of a combined instruction) will always retrieve the result from the bottom of the FIFO structure.

Each FIFO result queue 104a-104d has at least a depth D that is a function of both the coprocessor latency L and the coprocessor throughput 1/T (1 result every T cycles), and given by the formula:

$$D = \text{Ceiling}\,(L/T).$$

Extra entries within a FIFO result queue 104a-104d can ease instruction scheduling.

In the exemplary embodiment, up to four coprocessor extension units 103a-103d may be connected to the processor core 101, each of which should have a FIFO result queue 104a-104d. Since latency and throughput are parameters of the individual coprocessor extension units 103a-103d and may be different for different coprocessors, the depths of the respective FIFO result queues 104a-104d may also differ.

While the internal state of a coprocessor extension unit 103a-103d is updated only if the instruction predicate (the predicate status arriving during the data unit execute stage 2

DU-EXb2) is true, coprocessor results will be written into the respective FIFO result queue and the FIFO valid counter updated, always irrespective of the predicate state. XLD or corresponding instruction components always read from the FIFO result queue and update the FIFO status with regard for the predicate status, which removes timing constraints due to late arrival of the predicate in the DU-EX2 stage.

FIG. 2C illustrates pipelining of a simple coprocessor extension implemented without FIFO result queue, with the corresponding assembly code given in TABLE IV:

TABLE IV

| PC [31:0] | DU Instruction | | |
|---|---|---|---|
| (GP32 Mode) | Slot 1 | Slot 0 | Comments |
| 0x100 | DU-OP | XSD CR0, Rn, Rp, xfn (1) | CR0 = xfn(Rn, Rp) |
| 0x108 | DU-OP | XSD CR1, Rn, Rp, xfn (2) | CR1 = xfn(Rn, Rp) |
| 0x110 | DU-OP | XLD Rm, CR0, xfn_nop (3) | Rm = CR0 |
| 0x118 | DU-OP | XLD Rm, CR1, xfn_nop (4) | Rm = CR1 |

Any coprocessor extension unit 203a-203d without a FIFO result queue should include a result register coupled to the coprocessor extension result bus x_result. In the exemplary embodiment CR0 and CR1 are each assumed to represent either an internal state or register identifiers for a coprocessor-specific register file, while xfn indicates a coprocessor function specified using the #xspc field of the instruction.

In terms of pipeline timing, the critical coprocessor pipeline stage in FIG. 2C is the "Read Internal State & Write Result_Register of Extension."

Implementations without a FIFO result queue are well suited for short latency coprocessor solutions, although careful consideration must be paid to the fact that the predicates are available only in the DU-EX2 stage. Coprocessor extensions with FIFO result queues are efficient when the compiler employs loop pipelining. However, certain coprocessor solutions may not warrant the added complexity of saving and restoring the FIFO result queue.

In addition to the XSD, XLD, and XSDLD coprocessor extension instructions, an additional instruction form where only an operation but no operands are sent to the coprocessor and no result is retrieved is desirable:

XOP #xspc19 where the instruction includes nineteen user-defined bits. This format enables the coprocessor extension unit to perform an internal operation using either an immediate or internal state and to update an internal state (although internal state updating is not limited to XOP).

The architecture described above may be implemented in an ST120 processor, available from STMICROELECTRONICS, INC., with four versions of the XSD instruction, identical in encoding and differing only in the primary operation code (opcode) description. Similarly, two versions of the XLD instruction, four versions of the XSDLD instruction, and two versions of the XOP instruction may be implemented. The bitwise arrangement of the instructions is given below in TABLE V:

TABLE V

| [31:28] | [27:24] | [23:22] | [21] | [20:17] | [16:11] | [10:7] | [6:0] |
|---|---|---|---|---|---|---|---|
| Ga | xspc [10:7] | Ext# [1:0] | xspc [6] | Rb Source | xspc [5:0] | Rc Source | XSD (4 opcodes) |
| Ga | Ra Dest. | Ext# [1:0] | xspc [6] | Rb Source | xspc [5:0] | Rc Source | XSDLD (4 opcodes) |
| Ga | Ra Dest. | Ext# [1:0] | | Xpsc [14:0] | | | XLD (2 opcodes) |
| Ga | xspc [10:7] | Ext# [1:0] | | Xpsc [14:0] | | | XOP (2 opcodes) |

The instruction set encoding includes a 2-bit field Ext#[1:0] that allows addressing of up to four coprocessor extension units.

The semantics and syntax for GP32 instructions within a processor conforming to the ST120 architecture is shown in TABLE VI below, where xfn refers to the coprocessor extension function, "Xa" refers to the FIFO result queue and "a" is the 2-bit coprocessor extension number:

TABLE VI

| Mnemonic Syntax | GP32 Semantics | xfn Field Width |
|---|---|---|
| Gx? XSD<I>a, Rn, Rp, #xspc11 | Gx? [Xa=]xfn (Rn,Rp) | xspc[10:0] |
| Gx? XSDLD<i>a, Rm, Rn, Rp, #xspc7 | Gx? Rm=Xa‖xfn(Rn,Rp) | xspc[6:0] |
| Gx? XLD<I>a, Rm, #xspc15 | Gx? Rm=Xa, xfn | xspc[14:0] |
| Gx? XOP<I>a, #xspc19 | Gx? [Xa=]xfn | xspc[18:0] |

On the left hand side of the equations in the second column of TABLE VI, "Xa" refers to writing into the FIFO result queue while, on the right hand side, "Xa" refers to reading out of the FIFO result queue. In addition, <I> indicates the forms of the instruction (e.g., XSD1, XSD2, XSD3 or XSD4). All coprocessor instructions have an extension specific field xspc with the width, in bits, indicated by the appended number.

Every coprocessor instruction is predicated. Coprocessor extensions may be one of two types: coprocessors without any internal state or register file—i.e., a pure execution unit with a result queue (RQ) (Type A); and coprocessors with an internal state and/or register file, execution unit(s) and a result queue (Type B). The ST120 coprocessor instruction semantics with respect to usage of predicates for both types of coprocessors is shown in TABLE VII below:

TABLE VII

| Instruction | Coprocessor Semantics | Comment |
|---|---|---|
| Gx? XSD Rn, Rp, #xspc11 | [RQ=]xfn(Rn,Rp) | Write to RQ is not predicated |
|  | Gx? [Cn=]xfn(Rn,Rp) | In case of internal register, Cn is written to only if Gx is true |
| Gx? XLD Rm, #xspc15 | x_result=RQ | RQ is always read from |
|  | Gx? Rm=x_result | Rm written to if Gx is true |
|  | Gx? xfn( ) | Guarded internal operation |
| Gx? XSDLD Rm, Rn, Rp, #xspc7 | [RQ=]xfn(Rn,Rp) | Write to RQ is not predicated |
|  | Gx? [Cn=] xfn(Rn,Rp) | In case of internal register, Cn is written to only if Gx is true |
|  | x_result=RQ | RQ is read from always |
|  | Gx? Rm=x_result | Rm written to if Gx is true |
| Gx? XOP #xspc19 | [RQ=]xfn( ) | Write to RQ is not predicated |
|  | Gx? [Cn=]xfn( ) | In case of internal register, Cn is written to only if Gx is true |

"RQ" refers to the FIFO result queue, "Cn" refers to the coprocessor internal state (e.g., internal register), and "x_result" refers to the coprocessor result bus connecting to the core. Brackets (e.g., "{RQ=}") indicate that the write (to the result queue or the internal register Cn) is optional based on the coprocessor solution. Alternatives referencing internal register Cn exist only when the coprocessor has an internal state (Type B).

In the case of Type A coprocessor extensions (without any internal state), the predicate usage is similar to that of the existing ST120, with the XSD operation or component part of XSDLD or XOP instruction executed speculatively and only the part of the XLD component that writes to the DRF being predicated. It is important to note that write to the result queue and reads from the result queue are not predicated, such that Type A coprocessor extensions do not require the predicate from the core.

In the case of Type B coprocessor extensions (with internal state), the internal state update and pure internal coprocessor operations are predicated. XSD and XLD components can be merged into one XSDLD only when both components employ the same predicate (which also holds for XOP and XLD). By way of example, typical cases are a "not predicated" code (Gx=G15 for both components) or a code block predicated by Gx (a complete set of instructions "if converted" using Gx). When XSD and XLD components cannot hold the same predicate, XSDLD instructions are broken into two (XSD and XLD) instructions with their respective unique predicates as illustrated in the example given in TABLE VIII:

TABLE VIII

| PC |  |  | Instruction Components |  |
|---|---|---|---|---|
| (GP32) | Slot 1 | Slot 0 | XSD | XLD |
| 0x100 | DU-OP | Gx? XSD Rn, Rp, #xspc11 | Gx? XSD |  |
| 0x108 | DU-OP | Gy? XSD Rn, Rp, #xspc11 | Gy? XSD |  |
| 0x110 | DU-OP | Gx? XSDLD Rm, Rn, Rp, #xspc7 | Gx? XSD | Gx? XLD |
| 0x118 | DU-OP | Gy? XLD Rm, #xspc15 |  | Gy? XLD |
| 0x120 | DU-OP | Gx? XLD Rm, #xspc15 |  | Gx? XLD |

In the example of TABLE VIII, the instructions at PC=0x100, PC=0x110 and PC=0x120 are predicated on guard condition Gx for a Type B coprocessor while the instructions at PC=0x108 and PC=0x118 are predicated on guard condition Gy.

For both Type A and Type B coprocessor extensions, the FIFO result queue is written and updated irrespective of the predicate status of the instruction, and the FIFO result queue is read and the FIFO result queue pointers are updated on an XLD component irrespective of the predicate status of the instruction. For Type B coprocessor extensions, however, the coprocessor extension supplying the operands and extension specific opcode followed at a later time by another instruction retrieving the result of the corresponding earlier instruction should share the same predicate.

Figure 3:
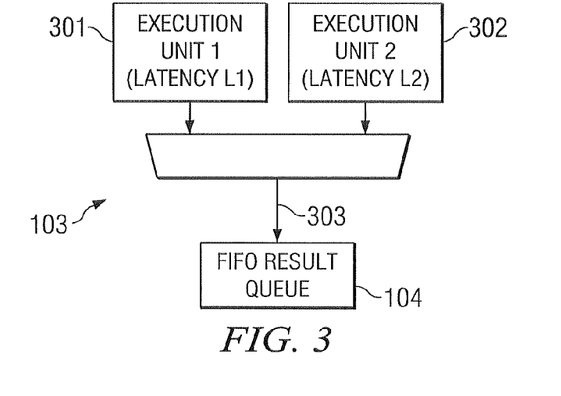
FIG. 3 illustrates a scheme for handling non-uniform instruction latencies within split transaction coprocessor extension units according to one embodiment of the present invention.

FIG. 3 illustrates a scheme for handling non-uniform instruction latencies within split transaction coprocessor extension units according to one embodiment of the present invention. A coprocessor extension unit 103 may conceivably have several execution units 301, 302 performing different types of instructions each with different execution latency. In order to optimally use the coprocessor and define rules for the compiler/optimizer to enforce, it should be remembered that the results of coprocessor instructions must be retrieved in program order. Assuming that two consecutive instructions i1,i2 with latencies L1, L2 are to be sent to the coprocessor (not necessarily in consecutive cycles), and that the execution units 301, 302 performing these instructions write results to the FIFO result queue 104 via a single port 303, two cases are presented:

a) L2≧L1, which implies that the extension result queue will not be updated by instruction i2 for (L2−L1)+1 cycles (note that in the present embodiment the "+1" is due to the fact that, in the best case, instructions i1 and i2 are issued in consecutive cycles), an acceptable circumstance since the instructions will not be competing for the result queue, which will be updated in order; and b) L2<L1, in which case potential conflict may occur with both execution units within the extension competing for the result queue, with the possibility that instruction i2 might attempt to update the result queue before instruction i1, unless the core stalls issuance of instruction i2.

Therefore, special scheduling logic is required to detect and handle the indeterminate case of L2<L1. The scheduler must be aware of the respective latencies of consecutive (or closely spaced) instructions received for issuance to the same coprocessor extension and, in the case of L2<L1, should wait L1−L2 cycles before dispatching the second instruction i2 to the coprocessor extension. The scheduler need not wait to dispatch instruction i2 when L2≧L1. The scheduler should apply these rules to optimally use the execution engines within the coprocessor extension.

Figure 4:
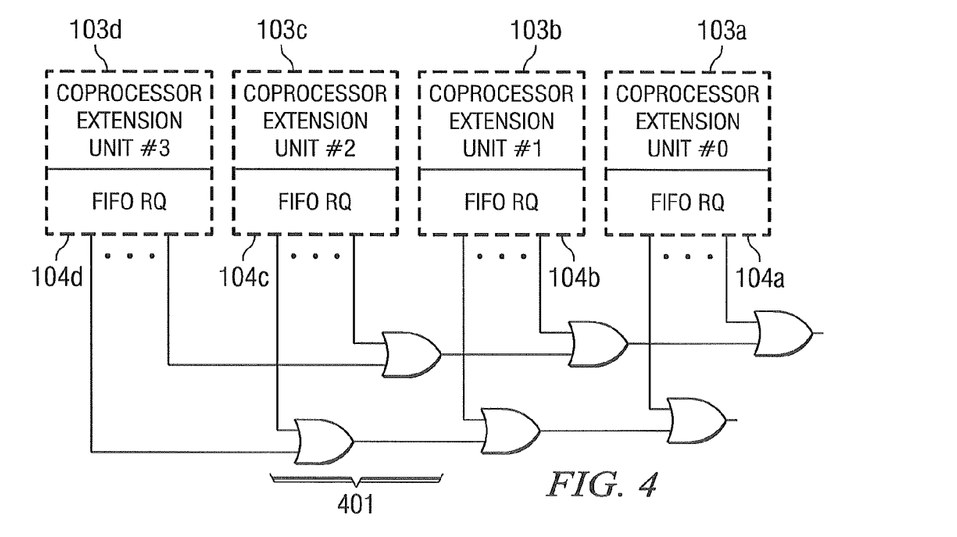
FIG. 4 illustrates one possible mechanism for connecting the result buses of multiple coprocessor extensions within split transaction coprocessor extension units according to one embodiment of the present invention.

FIG. 4 illustrates one possible mechanism for connecting the result buses of multiple coprocessor extensions within split transaction coprocessor extension units according to one embodiment of the present invention. The exemplary embodiment described above allows for up to four different coprocessor extension units, with potentially different instruction latencies. If each extension unit has a FIFO result queue, the scheduling rules of each extension unit need to be respected.

When a coprocessor is intensively used, the coprocessor may start a new calculation and write a new result every cycle to the DRF. As a result, when an interrupt occurs, results produced by the coprocessor cannot be moved into the data unit during draining of the pipeline, and the results would be lost absent temporary storage. The FIFO result queue is thus placed between the last pipe stage of the coprocessor and the core data unit to hold these results produced by the coprocessor. The programmer must ensure that at any cycle the number of pending results is less than or equal to the FIFO result queue depth so that the FIFO result queue cannot overflow in the event of an interrupt or core stall condition.

The number of valid entries in the FIFO result queue is contained within a register FIFO Counter (not shown), with reads and writes to the FIFO result queue conforming to the following rules:

when read, an empty FIFO result queue returns the last valid result already returned and the FIFO Counter remains unchanged at zero;

when read, a non-empty FIFO result queue returns the oldest entry, then drops that entry and decrements FIFO Counter;

when read and simultaneously written, an empty FIFO result queue returns back the last valid result previously returned, creates a new entry with the written data, and increments the FIFO Counter;

when read and simultaneously written, a non-empty FIFO result queue returns the oldest result, drops that result, creates a new entry with the written data, and leaves the FIFO Counter unchanged;

when read and simultaneously written, a full FIFO result queue works as just explained with the behavior guaranteed by the FIFO result queue microarchitecture or by implementing one more entry than required by the FIFO result queue theoretical size;

when written, an empty FIFO result queue creates a new entry with the written data and increments the FIFO Counter (from 0 to 1);

when written, a non-empty FIFO result queue creates a new entry with the written data and increments the FIFO Counter (from 0 to 1); and when written, a full FIFO result queue has undefined behavior.

To be able to save and restore the FIFO result queue upon the occurrence of an interrupt, some coprocessor instructions must be dedicated to this task as shown by Table IX below:

TABLE IX

| Coprocessor Instruction | Description |
|---|---|
| XLD Rm, xfn__rdrqcnt | Move the FIFO into the DU register Rm and copy the FIFO Counter value into the FIFO. If the FIFO Counter is 0, it is incremented; else it remains unchanged. |
| XLD Rm, xfn__rdrq | Move the FIFO into the DU register Rm. If the FIFO Counter is 0, it remains unchanged; else it is decremented. |
| XOP xfn__rstfifo | Reset FIFO Counter |
| XSD Rn, Rp, xfn__wrrq | Dedicated to 32-bit FIFO: Move Rn[31:0] into the 32-bit FIFO (Rp[31:0] is lost). FIFO Counter is incremented by 1. Dedicated to 40-bit FIFO: Move the concatenation of Rp[23:16] and Rn[31:0] into the 40-bit FIFO (Rp part in 8 MSB and Rn part in 32 LSB). FIFO Counter is incremented by 1. |
| XSD Rn, xfn__wrrqcnt | Move Rn[31:0] into the 32-bit FIFO Counter. |

Note that the FIFO result queue width may be either 32 or 40 bits in the exemplary embodiment.

Assuming either a 32-bit or 40-bit FIFO result queue with four entries, the pseudo-code for a FIFO saving routine is shown below:

```
G15? XLD R0, xfn__rdrqcnt;   // state 1 -> state 2
G15? XLD R1, xfn__rdrq;      // state 2 -> state 3
G15? XLD R2, xfn__rdrq;      // state 3 -> state 4
G15? XLD R3, xfn__rdrq;      // state 4 -> state 5
G15? XLD R4, xfn__rdrq;      // state 5 -> state 6
...                           // code saving R0 to R4 somewhere
```

Assuming a 32-bit FIFO result queue with four entries, the pseudo-code for a FIFO restoring routine is shown below:

```
...                           // code which restores R0 to R4 from the
...                           // location used by the save routine
G15? XOP xfn__rstfifo;        // state 7 -> state 8
G15? XSD R0, R0, xfn__wrrq;   // state 8 -> state 9 (second R0 is dummy)
G15? XSD R1, R1, xfn__wrrq;   // state 9 -> state 10 (second R1 is dummy)
G15? XSD R2, R2, xfn__wrrq;   // state 10 -> state 11 (second R2 is dummy)
G15? XSD R3, R3, xfn__wrrq;   // state 11 -> state 12 (second R3 is dummy)
G15? XSD R4, xfn__wrrqcnt;    // state 12 -> state 13
```

Assuming a 40-bit FIFO result queue with four entries, the pseudo-code for a FIFO restoring routine is shown below:

```
...                              // code which restores R0-R3, R10-R13 and R4
...                              // from the location used by the save routine
G15? XOP xfn__rstfifo;           // state 7 -> state 8
G15? XSD R0, R10, xfn__wrrq;     // state 8 -> state 9
G15? XSD R1, R11, xfn__wrrq;     // state 9-> state 10
G15? XSD R2, R12, xfn__wrrq;     // state 10 -> state 11
G15? XSD R3, R13, xfn__wrrq;     // state 11 -> state 12
G15? XSD R4, xfn__wrrqcnt;       // state 12 -> state 13
```

Note that clearing the FIFO Counter is not necessary if the FIFO result queue is empty before execution of the restore routine, which should be the normal case since consuming all results generated by the instructions issued to the coprocessor is a strongly recommended software practice.

Figure 5:
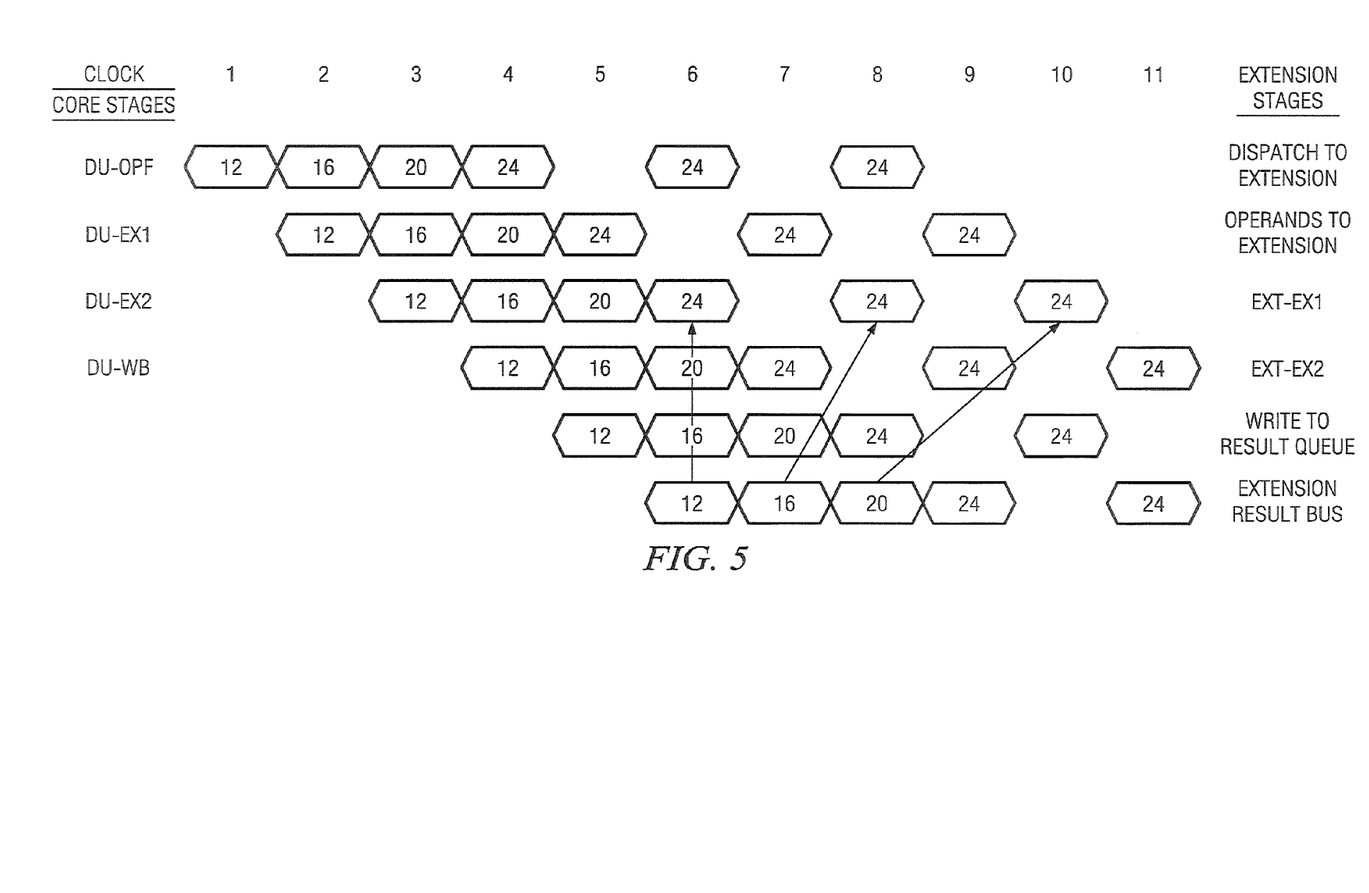
FIG. 5 is a timing diagram illustrating operation of an example Galois multiplier split transaction coprocessor extension unit according to one embodiment of the present invention.

FIG. 5 is a timing diagram illustrating operation of an example Galois multiplier split transaction coprocessor extension unit according to one embodiment of the present invention. The exemplary Galois multiplier extension (GMX) unit takes two 32-bit operands and produces a 32-bit result performing a Galois multiply on four 8-bit fields. The extension unit is identified as GMX in the Ext# field, and is assumed to include a fully pipelined, two-cycle extension execution engine followed by a single cycle write to the result queue, such that the latency seen by the program on the core is 3 cycles. With software pipelining, one result can be produced and written to the DRF per cycle after the initial latency, as illustrated in the pseudo-code sequence below:

```
           .sliwmd
//Software pipelining: prologue
        10    G15? !d R0, @(P0 !+4)
        11    G15? !d R1, @(P1 !+4)
        12    G15? xsd gmx, R0, R1, gmpy // gmx: Ext# gmpy: Extension Specific
        13    nop
        14    G15? !d R0, @(P0 !+4)
        15    G15? !d R1, @(P1 !+4)
        16    G15? xsd gmx, R0, R1, gmpy
        17    nop
        18    G15? !d R0, @(P0 !+4)
        19    G15? !d R1, @(P1 !+4)
        20    G15? xsd gmx, R0, R1, gmpy
        21    nop
// Loop Starts
        22    G15? !d R0, @(P0 !+4)
        23    G15? !d R1, @(P1 !+4)
        24    G15? xsdld gmx, R2, R0, R1, gmpy
        25    nop
        26    G15? sdw @(P2 !+4), R2
        27    nop
        28    nop
        29    nop
// Loop Ends
// Epilogue
        30    G15? xld gmx, R2
        31    nop
        32    G15? sdw @(P2 !+4), R2
        33    nop
        34    G15? xld gmx, R2
        35    nop
        36    G15? sdw @(P2 !+4), R2
        37    nop
        38    G15? xld gmx, R2
        39    nop
        40    G15? sdw @(P2 !+4), R2
        41    nop
```

The basic model is to read the Galois fields from memory and write two 32-bit data register file (DRF) operands to the extension unit using XSD to prime the pipeline. Once the pipeline is set-up, XSDLD is used to retrieve the result and supply the next two 32-bit DRF operands. Note that in instruction 24 an operation and two operands are supplied and the result retrieved using a single instruction.

FIG. 5 illustrates operation of the extension when operands must be retrieved from memory and the result of the extension instruction must be stored in memory. The numbers within the instructions correspond to the instructions in the pseudo-code above. In the example shown, a result is retrieved every other cycle, and the core only allows two memory address unit (AU) operations per cycle while each loop iteration requires three memory accesses (two loads, one store). However, the coprocessor interface has the capability to produce a result every cycle. The FIFO result queue needs to be three deep to hold the results before returning them to the core, which becomes important when an interrupt occurs inside this loop or under stalling conditions. The interrupt handler should be able to retrieve, store and restore the results from the three-entry deep FIFO in case another thread requires use of this coprocessor.

In the present invention, use of a split transaction extension unit provides a flexible alternative for customizing high performance digital signal processors, allowing an execution unit with a special instruction to be added without complete redesign of the architecture. The coprocessor architecture is customizable with a well-defined interface supporting multiple coprocessors, allowing for easy integration of the coprocessor with a core hard-macro on a System On Chip (SOC) processor subsystem. The coprocessor architecture is based on a split-instruction transaction model tightly coupled to the core data unit to appear like another data unit. The architecture of the present invention accommodates multi-cycle latency extension execution and fully exploits decoupled architectures. A scalable FIFO result queue with associated save/restore instruction forms is defined to support efficient pipelining and static scheduling of coprocessor operations, and an additional internal state may be added at will.

The present invention supports multi-cycle latency execution extensions and generic coprocessor instructions to effectively pipeline multi-cycle execution operations. The scalable FIFO result queue removes register pressure and accommodates stalls in the core, allowing the coprocessor extension pipeline to operate independently with respect to the core. Instruction predicates are available to the coprocessor extension.

The architecture of the exemplary embodiment supports up to four coprocessor extension units and at least two types of connection (OR logic or tri-state) for result buses from the coprocessors. Non-uniform latencies in a coprocessor extension and multi-cycle are supported.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A processor extension mechanism comprising:
   a processor core;
   an electrical interface coupling the processor core to an extension unit, the extension unit configured to perform at least one computational operation on one or more operands, the electrical interface including connections to one or more instruction and operand buses and a result bus; and
   a controller capable of issuing a first instruction on the electrical interface to initiate execution of a computational operation within an extension unit and issuing a second instruction on the electrical interface to retrieve a result of the computational operation.

2. The mechanism according to claim 1, wherein the controller comprises a data unit within the processor core.

3. The mechanism according to claim 1, wherein the controller supports;
   an instruction for sending an operation and data to an extension unit,
   an instruction for sending an operation to and loading data from an extension unit,
   an instruction for concurrently sending an operation and data to an extension unit and loading data from that extension unit, and
   an instruction for sending an operation to an extension unit.

4. The mechanism according to claim 1, wherein the electrical interface is capable of coupling the processor core to a plurality of extension units each performing at least one computational operation on one or more operands.

5. The mechanism according to claim 1, further comprising:
   an extension ant capable of executing two or more instructions each having different execution latencies.

6. The mechanism according to claim 5, further comprising:
   a result queue coupled between the extension unit and the controller and storing results of computational instructions executed by the extension unit.

7. The mechanism according to claim 6, further comprising:
   connections from the result queue to the result bus employing either OR logic or tri-state devices.

8. The mechanism according to claim 1, wherein the controller further comprises a mechanism for saving and restoring results of operations previously initiated within an extension unit.

9. The mechanism according to claim 1, wherein a design for the processor may be modified to add, remove or alter an extension unit without regenerating the processor design.

10. A method of executing extended instructions within a processor comprising:
    operating a processor core;
    driving an electrical interface capable of coupling the processor core to an extension unit for performing at least one computational operation on one or more operands, the electrical interface including connections to one or more instruction and operand buses and a result bus;
    issuing a first instruction on the electrical interface to initiate execution of a computational instruction within an extension unit; and
    issuing a second instruction on the electrical interface to retrieve a result of the computational instruction.

11. The method according to claim 10, wherein a data unit within the processor core issues the first and second instructions.

12. The method according to claim 10, wherein the first and second instructions comprise one of:
    an instruction for sending an operation and data to an extension unit,
    an instruction for sending an operation to and loading data from an extension unit,
    an instruction for concurrently sending and operation and data to an extension unit and loading data from that extension unit, and
    an instruction for sending an operation to an extension unit.

13. The method according to claim 10, wherein the electrical interface couples the processor core to a plurality of extension units each performing at least one computational operation on one or more operands.

14. The method according to claim 10, further comprising:
executing two or more instructions each having different execution latencies within an extension unit.

15. The method according to claim 14, further comprising:
storing results of computational instructions executed by an extension unit within a result queue coupled between the extension unit and the core.

16. The method according to claim 15, further comprising:
transmitting results from the result queue to the result bus employing either OR logic or tri-state devices.

17. The method according to claim 10, further comprising:
selectively saving and restoring results of operations previously initiated within an extension unit during interrupts or core stalls.

18. The method according to claim 10, wherein a design for the processor may be modified to add, remove or alter an extension unit without regenerating the processor design.

19. A processor comprising:
a processor core including a data unit;
one or more extension units each performing at least one computational operation on one or more operands; and
an instruction bus, at least one operand bus, and a result bus each coupling the data unit to each of the one or more extension units,
wherein the data unit issues a send operation and data to extension unit instruction component on the instruction bus to initiate execution of a computational instruction within an extension unit and a load data from extension unit instruction on the instruction bus to initiate retrieval of a result of the computational instruction on the result bus.

20. The processor according to claim 19, wherein at least one of the one or more execution units executes a computational instruction with multi-cycle execution latency.

21. The processor according to claim 19, wherein the data unit issues instructions on the instruction bus to initiate execution of a computational instruction within an extension unit in a pipelined manner.

22. The processor according to claim 19, wherein execution pipes within one of the one or more execution units each execute different computational instructions with different execution latencies, issuance of the different computational instructions being controlled to prevent a result of a first instruction from being preceded by a result from a subsequent instruction.

23. The processor according to claim 19, further comprising:
FIFO result queues between each of the one or more extension units and the result bus, each FIFO result queue having a depth sufficient to accommodate results far all pipelined instructions within the respective extension unit, allowing the extension unit to operate independent of the processor core.

24. The processor according to claim 19, further comprising:
an internal register within one of the extension units, the data unit issuing an extension operation instruction on the instruction bus to update the internal register.

25. The processor according to claim 19, wherein the data unit further comprises a mechanism for saving and restoring results of operations previously initiated within an extension unit.

26. The processor according to claim 19, wherein a design for the processor may be modified to add, remove or alter an extension unit without regenerating the processor design.

* * * * *

UNITED STATES PATENT AND TRADEMARK OFFICE
CERTIFICATE OF CORRECTION

PATENT NO.       : 7,600,096 B2  
APPLICATION NO.  : 10/299120  
DATED            : October 6, 2009  
INVENTOR(S)      : Parthasarathy et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1573 days.

Signed and Sealed this

Fifth Day of October, 2010

David J. Kappos  
*Director of the United States Patent and Trademark Office*